United States Patent
Sasaki et al.

(10) Patent No.: US 7,301,869 B2
(45) Date of Patent: *Nov. 27, 2007

(54) SPHERICAL ABERRATION CORRECTING METHOD AND APPARATUS

(75) Inventors: Yoshio Sasaki, Tokorozawa (JP); Hisao Tanaka, Tokorozawa (JP); Hidenori Nakagawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 483 days.

This patent is subject to a terminal disclaimer.

(21) Appl. No.: 10/627,081

(22) Filed: Jul. 24, 2003

(65) Prior Publication Data

US 2004/0017743 A1    Jan. 29, 2004

(30) Foreign Application Priority Data

Jul. 25, 2002    (JP)    ............ P2002-216667

(51) Int. Cl.
    *G11B 20/10*    (2006.01)
    *G11B 7/135*    (2006.01)

(52) U.S. Cl. .............. 369/47.53; 369/47.49; 369/112.02

(58) Field of Classification Search ............ 369/112.02
See application file for complete search history.

(56) References Cited

U.S. PATENT DOCUMENTS 5,828,636 A    10/1998    Matsumoto et al.
6,643,230 B2*  11/2003    Furukawa ............... 369/44.23
6,771,584 B2*  8/2004     Yamanaka ............. 369/112.23
6,922,386 B2*  7/2005     Shintani et al. ........ 369/112.01
7,006,411 B2   2/2006     Hirai ...................... 369/44.24
2001/0026522 A1* 10/2001  Yanagawa .................... 369/94
2001/0040853 A1* 11/2001  Hayashi et al. ........ 369/112.12
2003/0227859 A1  12/2003  Hirai ...................... 369/44.24
2004/0174781 A1*  9/2004  Nishi ..................... 369/44.32

FOREIGN PATENT DOCUMENTS

| EP | 1 191 523 A2 | 3/2002 |
| JP | 10 106012 A | 7/1998 |
| JP | 10-269611 | 10/1998 |
| JP | 2001-236674 | 8/2001 |
| JP | 2002-015454 | 1/2002 |
| JP | 2000 285485 A | 2/2005 |

* cited by examiner

*Primary Examiner*—Thang V. Tran
*Assistant Examiner*—Parul Gupta
(74) *Attorney, Agent, or Firm*—Ladas & Parry LLP

(57) ABSTRACT

In a spherical aberration correcting apparatus, a test recording unit is configured to perform a test recording on an optical disk. A characteristic obtaining unit is configured to obtain a characteristic corresponding to a parameter by the test recording. The parameter is correlated with a spherical aberration. A correction amount deciding unit is configured to decide an optimum correction amount of the spherical aberration so as to minimize the spherical aberration according to the characteristic of the parameter. A spherical aberration correcting unit is configured to correct the spherical aberration according to the optimum correction amount of the spherical aberration.

9 Claims, 10 Drawing Sheets

RECORDING MARK
TO BE FORMED

REFLECTED LIGHT
UNDER REPRODUCTION

RECORDING PULSE
WAVEFORMS IN
RECORDING

DETECTED SIGNAL S4
UNDER RECORDING

DETECTED SIGNAL S5
AFTER PROCESSING
AT LPF

DVD-R
SPHERICAL ABERRATION VS PIT LEVEL

DVD-R
SPHERICAL ABERRATION VS PIT RATIO

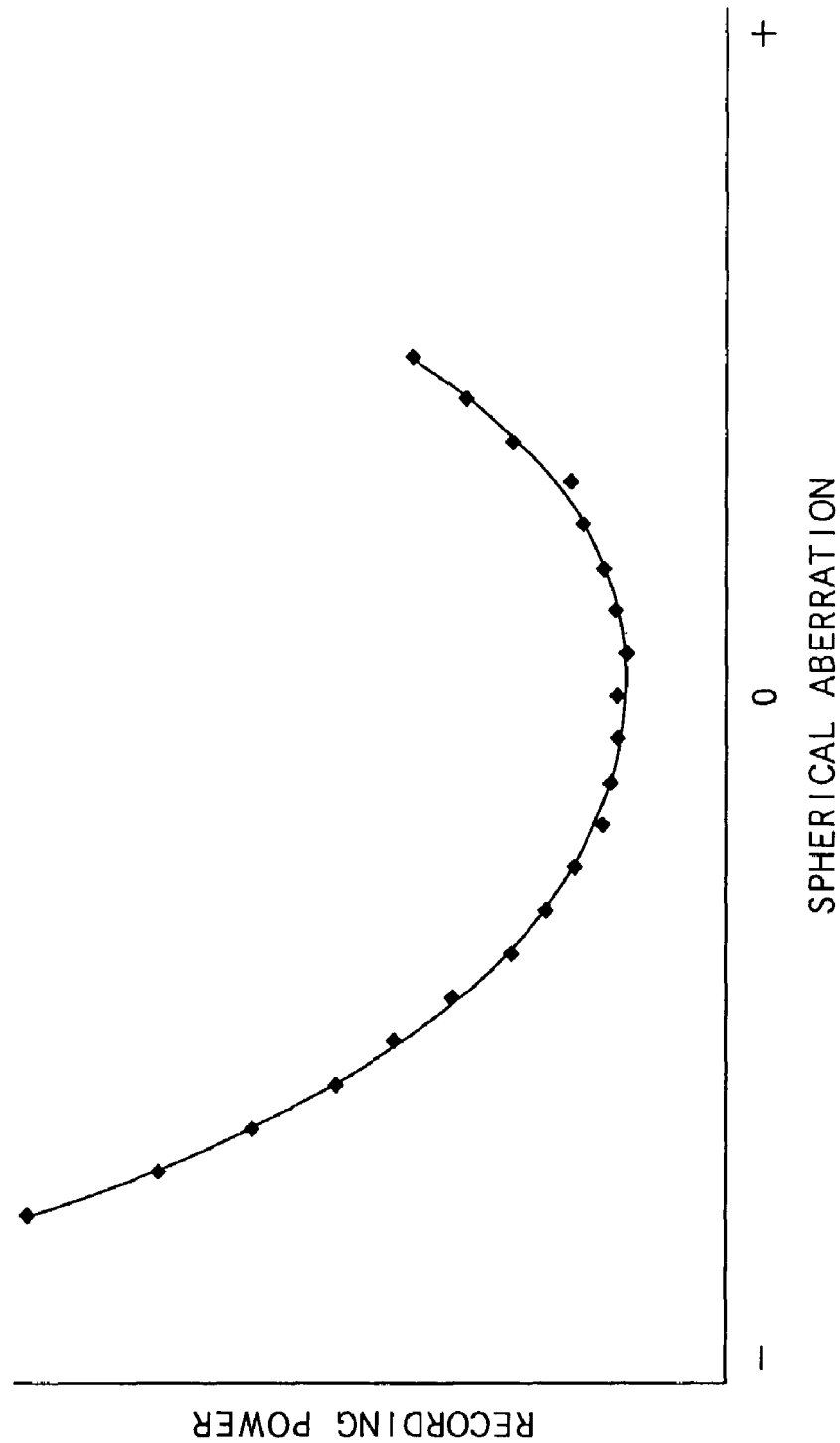

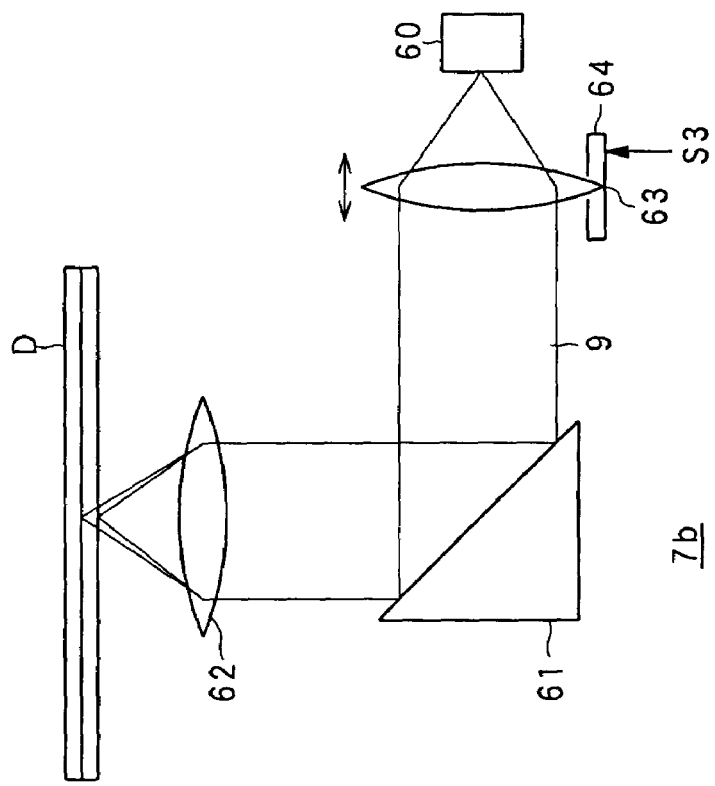
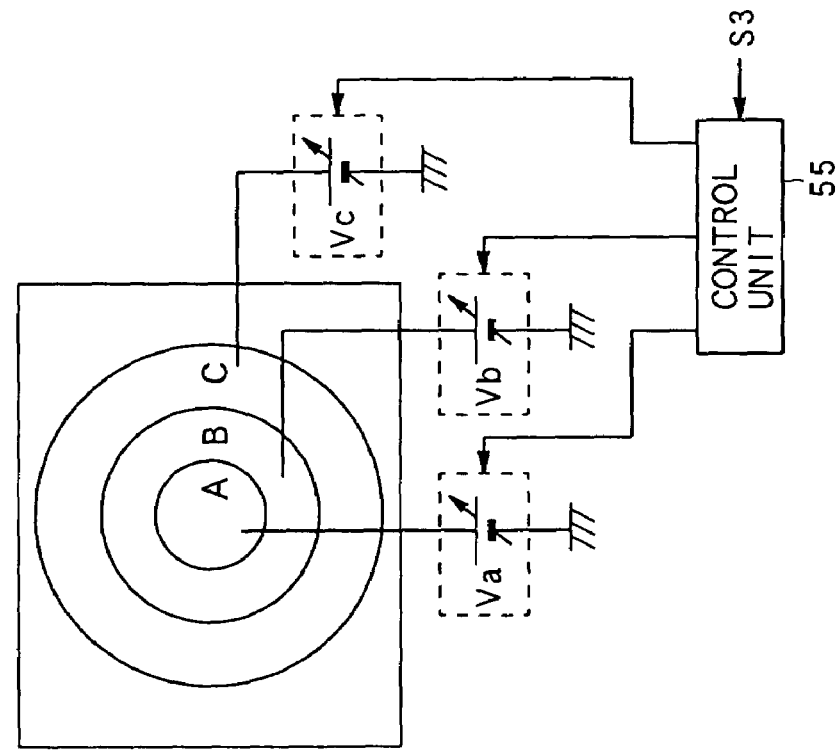
FIG.10A
FIG.10B

SPHERICAL ABERRATION CORRECTING METHOD AND APPARATUS

BACKGROUND OF THE INVENTION

1. Field of the Invention

The present invention relates to a technical field of spherical aberration correcting method and apparatus in a recording system for recording bits of information onto an optical recording medium.

2. Description of the Related Art

It is general that a transparent layer is formed on a recording surface of an optical disk serving as an optical recording medium. The transparent layer has a predetermined thickness and is placed to cover the recording surface of the optical disk so that the recording surface can be protected.

An optical information recording/reproducing system is configured to irradiate a reading or recording optical beam onto the recording surface of the optical disk through the transparent layer to read or record data from or to the optical disk.

However, in reality, it is difficult to form the optical disk so that each portion of the transport layer falls within a specified range of thickness. As a result, a usual optical disk has as much a thickness error as several tens of micro-meter (μm) due to irregularities over the transparent layer. Such an error in the thickness of the optical disk causes spherical aberration to occur in an optical beam irradiated onto the optical disk, thus reducing accuracy of reading or recording data from or to the optical disk.

For actually recording bits of information onto the optical disk, changes in recording conditions including the circumferential temperature at the start of recording and the like will cause the spherical aberration to fluctuate.

The more accelerated the rate of recording is in the future, the more influenced the spherical aberration to a recording characteristic will be, so that it is necessary to prevent the spherical aberration as much as possible. The foregoing problem, though it is mere one example, is included in the difficulties which should be solved by the present invention.

SUMMARY OF THE INVENTION

An object of the present invention is to provide, with due consideration to the difficulties of the above conventional technique, a spherical aberration correcting method and apparatus that are capable of effectively correcting spherical aberration.

According to one aspect of the present invention, there is provided a spherical aberration correcting apparatus comprising: a test recording unit configured to perform a test recording on an optical recording medium; a characteristic obtaining unit configured to obtain a characteristic corresponding to a parameter by the test recording, the parameter being correlated with a spherical aberration; a correction amount deciding unit configured to decide an optimum correction amount of the spherical aberration so as to minimize the spherical aberration according to the characteristic of the parameter; and a spherical aberration correcting unit configured to correct the spherical aberration according to the optimum correction amount of the spherical aberration.

According to another aspect of the present invention, there is provided a spherical aberration correcting method comprising the steps of: performing a test recording on an optical recording medium; obtaining a characteristic corresponding to a parameter according to the test recording, the parameter being correlated with a spherical aberration; deciding an optimum correction amount of the spherical aberration so as to minimize the spherical aberration according to the characteristic of the parameter; and correcting the spherical aberration according to the optimum correction amount of the spherical aberration.

BRIEF DESCRIPTION OF THE DRAWINGS

Other objects and aspects of the present invention will become apparent from the following description of embodiments with reference to the accompanying drawings in which:

FIG. 7 is a view showing a correlation between the spherical aberration and a recording power according to the second embodiment;

FIG. 10A is a view typically illustrating a structure of a liquid crystal type of spherical aberration correcting unit according to the second embodiment; and FIG. 10B is a view illustrating a structure of an optical element type of the spherical aberration correcting unit according to the second embodiment.

DETAILED DESCRIPTION OF PREFERRED EMBODIMENTS

Preferred embodiments of a spherical aberration correcting method and apparatus of the present invention will now be described hereinafter with reference to the accompanying drawings.

Figure 1:
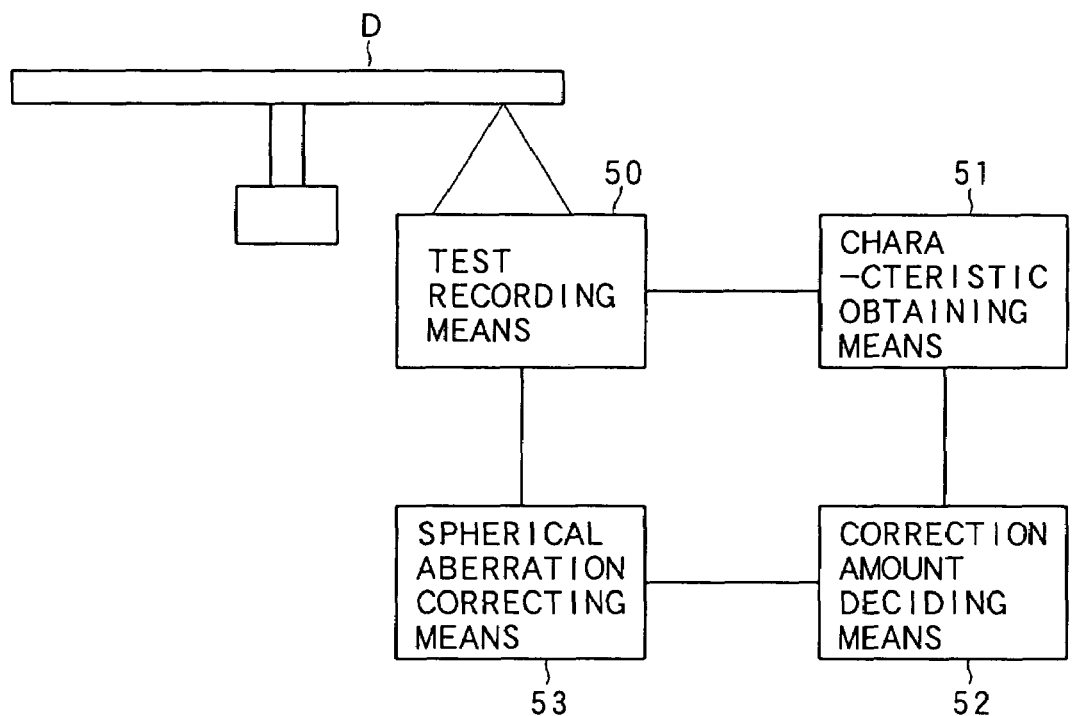
FIG. 1 is a view showing a schematic configuration of a spherical aberration apparatus according to a first embodiment of the present invention.

FIG. 1 is a view showing a schematic configuration of a spherical aberration correcting apparatus according to a first embodiment of the present invention. In FIG. 1, an optical disk D is formed of a type of optical recording medium which is rotatable and allows information to be recorded thereon.

The optical disk D is provided a recording surface and a transparent layer formed on the recording surface. The transparent layer has a predetermined thickness and is produced to cover over the recording surface of the optical disk for protecting the recording surface.

The spherical aberration correcting apparatus according to the first embodiment comprises a test recording means 50, a characteristic obtaining means 51, a correction amount deciding means 52, and a spherical aberration correcting means 53.

The test recording means 50 is configured to perform a test recording on an optical disk that serves as an object for recording bits of information. To use a test recording area previously formed on the optical disk for calibration or the like allows the test recording to be performed. The test recording means 50 is, when performing the test recording, configured to irradiate an optical beam onto the test recording area of the recording surface of the optical disk to form pits as test recorded signal (test recorded data) thereon.

The characteristic obtaining means 51 uses the information recorded by the test recording to obtain characteristics related to parameters correlated with a spherical aberration. In detail, the characteristic obtaining means 51 can obtain each characteristic corresponding to each of the parameters in two different methods.

One of the methods is, after the test recording is completed, to reproduce the test recorded signal (the test recorded data) corresponding to the information recorded by the test recording so as to obtain each characteristic of each parameter on the basis of the reproduced test signal.

In this case, the parameters correlated with the spherical aberration include, for example, a jitter representing the variation of the reproduced test signal, a β (beta) value, a modulation of the reproduced test signal, and an asymmetry of the reproduced test signal. Normalizing a difference between the land level and the pit level in the RF signal with respect to the RF amplitude thereof obtains the β value, and the RF signal is obtained by AC coupling the reflected-light from the optical disk D corresponding to the information recorded by the test recording.

That is, the characteristic obtaining means 51 is configured to reproduce the test signal recorded by the test recording so as to measure at least one of the characteristics which corresponds to at least one of the parameters.

Another method is to obtain at least one of the characteristics, which corresponds to at least one of the predetermined parameters while the test recording is performed, wherein the predetermined parameter can be set to a pit level of the pit or a pit ratio thereof.

The correction amount deciding means 52 is configured to decide an optimum amount of correction of the spherical aberration, allowing the spherical aberration to be minimized.

Assuming that the jitter is used as at least one of the parameters, the jitter has a correlation with the spherical aberration such that, when the jitter becomes the minimum value, the spherical aberration becomes the minimum value. On the basis of the correlation between the jitter and the spherical aberration, the characteristic obtaining means 51 reproduces the test signal recorded by the test recording so as to measure the characteristic of the jitter, and the correction amount deciding means 52 decides the amount of correction of the spherical aberration at which the measured jitter is minimized as the optimum amount of correction of the spherical aberration.

When deciding the optimum amount of correction of the spherical aberration, the correction amount deciding means 52 provides the optimum amount of correction to the spherical aberration correcting means 53. The spherical aberration correcting means 53 is configured to perform a correction on the spherical aberration according to the provided optimum amount of correction.

As the spherical aberration correcting means 53, already known various correcting elements, for example, a liquid crystal element, an optical element, or other similar elements may be used.

A second embodiment of applying the spherical aberration correcting unit to an information recording system will now be described with reference to the accompanying drawings.

[Structure of the Information Recording System]

Figure 2:
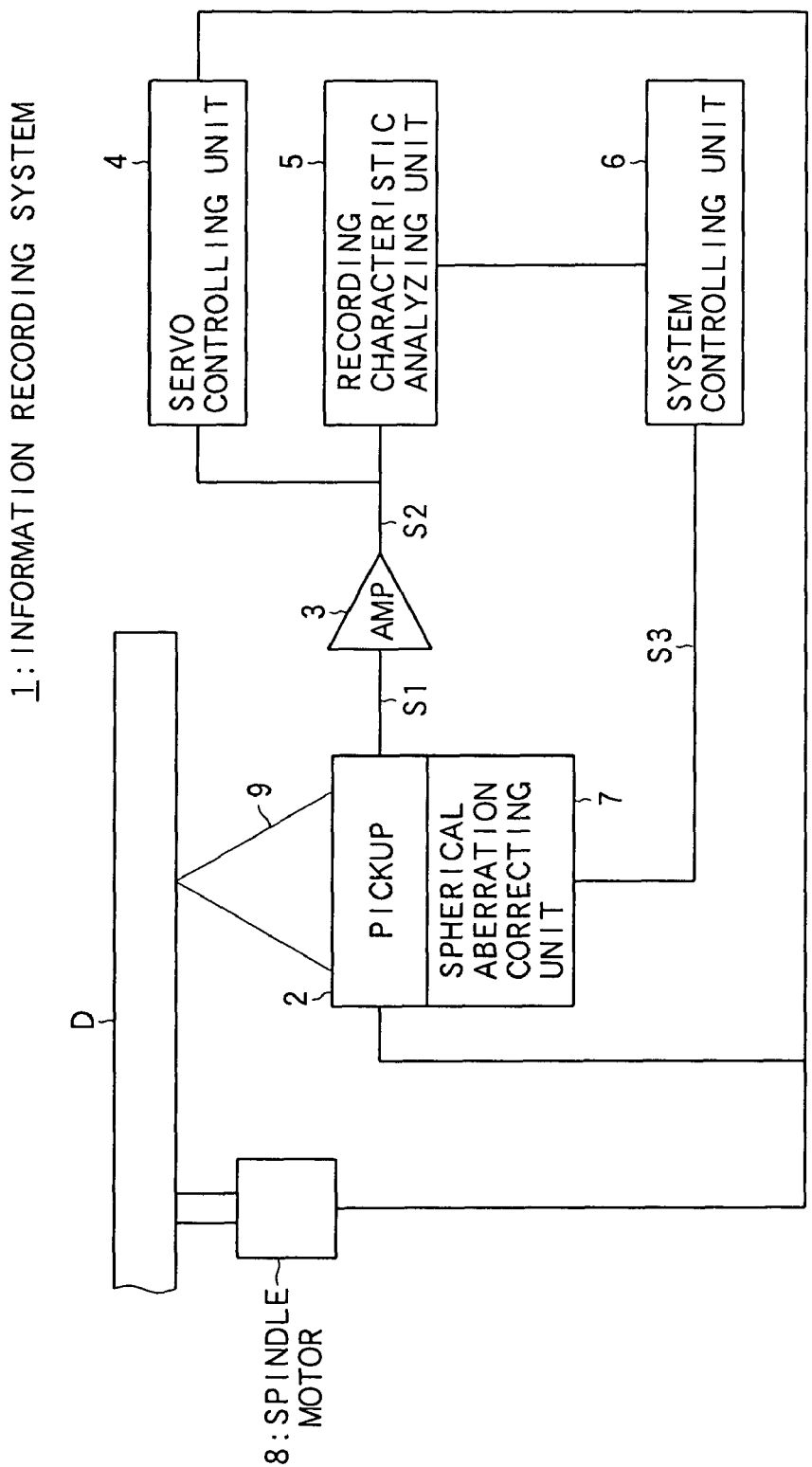
FIG. 2 is a view showing a schematic configuration of the information recording system to which the spherical aberration correcting unit is applied.

FIG. 2 shows a schematic configuration of the information recording system to which the spherical aberration correcting unit is applied.

In FIG. 2, the information recording system 1 is configured so that information can be recorded onto an optical disk D and information recorded on the optical dick D can be read to be reproduced.

The information recording system 1 comprises a pickup 2 having, for example, a laser diode as a light source and an optical system with an objective lens and the like, an amplifier 3, a servo control unit 4, a recording characteristic analyzing unit 5, a system controlling unit 6, a spherical aberration correcting unit 7 and a spindle motor 8. Incidentally, in FIG. 2, the above elements 2 to 8 which are related to the spherical aberration correction of the present invention are mainly illustrated.

As the optical disk D, various optical disks such as, for example, CD-R (Compact Disc-Recordable), DVD-R (Digital Versatile Disc-Recordable), DVD-RW (Digital Versatile Disc-Rewritable), DVD+R (DVD+Recordable) and DVD+RW (DVD+Rewritable), on which information can be recorded only at once, or information can be recorded a plurality of times can be used.

The spindle motor 8 is configured to rotate the optical disk D at a predetermined rotation rate, and control the rotation thereof.

The pick-up 2 is configured to irradiate an optical beam 9 onto the optical disk D, and receive a reflected-light from an information recording surface of the optical disk D to provide the reflected-light that functions as a detection signal S1, which is an electrical signal, to the amplifier 3.

The amplifier 3 is configured to amplify the detection signal S1 at a predetermined gain to supply a detection signal S2 which is amplified from the detection signal S1 to the servo controlling unit 4 and the recording characteristic analyzing unit 5, respectively.

The servo controlling unit 4 is configured to generate servo error signals such as a tracking error signal, a focus error signal and the like according to the supplied detection signal S2 through one of the already known various methods of generating the servo error signals.

The servo controlling unit 4 supplies the generated servo error signals to the pick-up 2 and the spindle motor 8, respectively. The supplied servo error signals from the servo controlling unit 4 is used to control the rotation number of the spindle motor 8, whereby the spindle servo control is performed.

The supplied servo error signals from the servo controlling unit 4 is used to control a position of the objective lens of the pick-up 2 and the like, whereby the various types of servo control, such as the focus servo and the tracking servo, are performed.

The recording characteristic analyzing unit 5 is configured to measure each of the characteristics of each of the parameters according to the detection signal S2 obtained by the test recording, and analyze each of the characteristics to supply the analyzed result of each of the characteristics to the system controlling unit 6.

As described hereinafter in detail, the recording characteristic analyzing unit 5 can measure each characteristic corresponding to each of the parameters by two different methods.

One of the methods is to perform the test recording and to reproduce the test recorded data recorded on the recording surface by the test recording so as to measure each recording characteristic of each parameter on the basis of the reproduced test recorded data.

In this case, the recording parameters include, for example, the jitter, the $\beta$ (beta) value, the modulation and the asymmetry of the reproduced test recorded data.

Another method is to obtain at least one of the characteristics, which corresponds to at least one of the predetermined parameters while the test recording is performed, wherein the at least one of the characteristics corresponds to a predetermined parameter, such as a pit level of the pit, a pit ratio thereof or the like.

These parameters will now be detailed hereinafter.

The system controlling unit 6 comprises a microcomputer and the like and is configured to decide the optimum correction amount of spherical aberration according to the analyzed result of each of the characteristics to provide a control signal S3 corresponding to the optimum correction amount of spherical aberration to the spherical aberration correcting unit 7.

The spherical aberration correcting unit 7 is configured to correct the spherical aberration caused in the optical beam 9 due to irregularities over the portions of the transparent layer of the optical disk D. That is, the spherical aberration correcting unit 7 is configured to correct the optimum correction amount of the spherical aberration caused in the optical beam 9, the optimum correction amount corresponding to the control signal S3.

As the spherical aberration correcting unit 7, already known various correcting units may be used.

For example, one of the correcting units comprises a plurality of liquid crystal regions concentrically arranged and placed on the optical beam path. That is, in such a correcting unit, controlling voltages applied to the liquid crystal regions causes changes in phase of the optical beam 9 transmitted through the liquid crystal regions, thereby correcting the spherical aberration of the optical beam 9. The correcting unit using the plurality of liquid crystal regions is referred to as "crystal liquid type" hereinafter.

Another correcting unit comprises an optical element such as a collimate lens placed in the optical beam path. That is, in such a unit, controlling the optical element causes a spherical aberration which has an inverted characteristic of the spherical aberration already caused in the optical beam 9, thereby canceling the spherical aberrations with each other. The correcting unit using such an optical element is referred to as "optical element type" hereinafter.

That is, various correcting units capable of correcting the spherical aberration caused in the optical beam 9 can be applied to the present invention.

In this regard, the control signal S3 supplied to the spherical aberration correcting unit 7 from the system controlling unit 6 depends on the type of the spherical aberration correcting unit 7. For example, when adopting the liquid crystal type of spherical aberration correcting unit, the control signal S3 is formed of a signal representing a voltage applied to each of the liquid crystal regions. Meanwhile, when adopting the optical element type of spherical aberration correcting unit, the control signal S3 is formed of a signal representing a distance of the optical element or the like.

[Analysis of the Recording Characteristics]

Next, a correlation between each parameter analyzed by the recording characteristic analyzing unit 5 and the spherical aberration will now be described.

The recording characteristic analyzing unit 5 is configured to measure, according to the reproduced test recorded data, parameters which include the jitter, the $\beta$ value, the pit level, the pit ratio and so on, before the measured parameters are correlated with the spherical aberration so as to analyze them.

Figure 3:
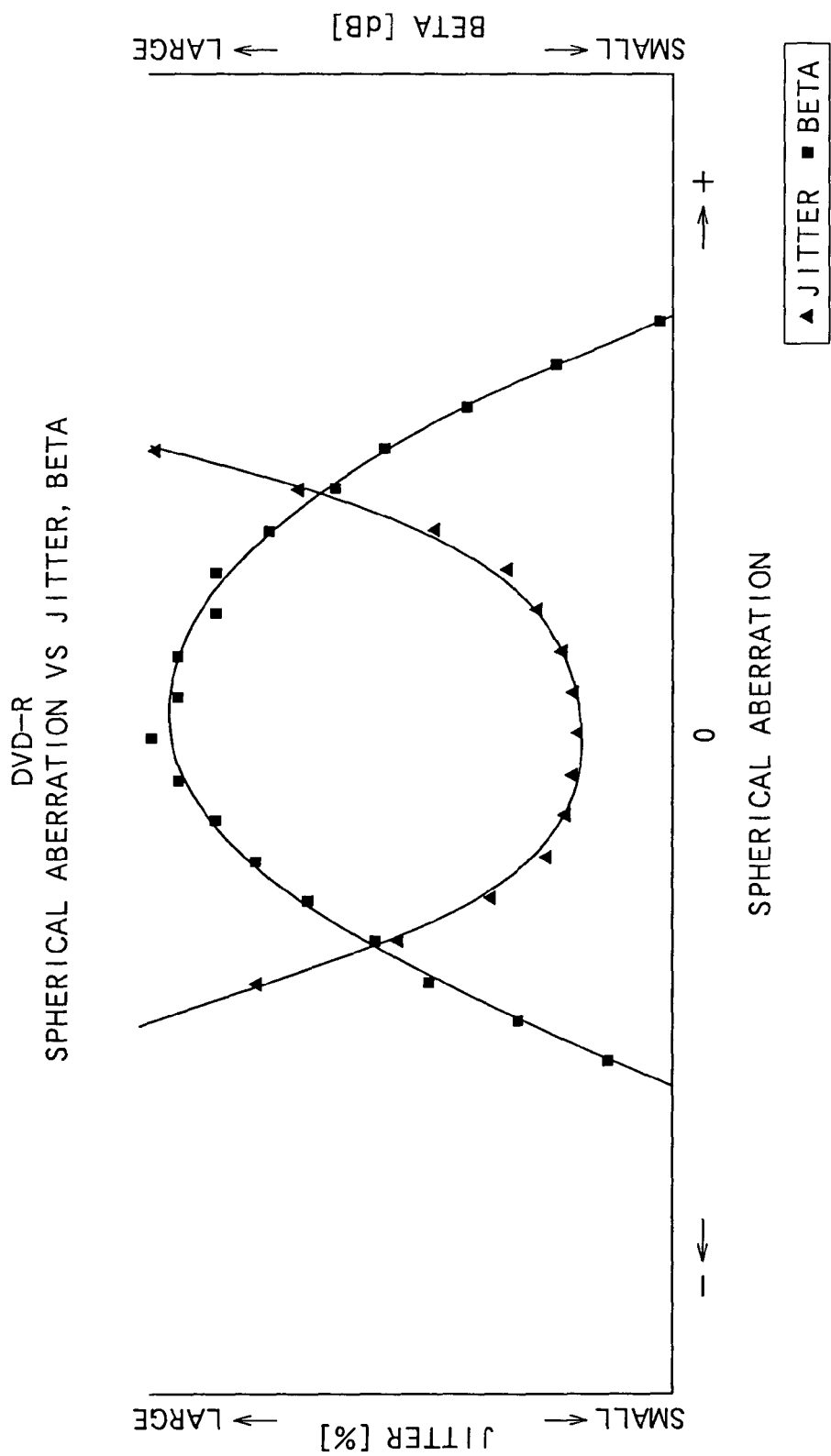
FIG. 3 is a view illustrating a correlation between a spherical aberration and a jitter, and a correlation between the spherical aberration and a β (beta) value in the case of using a DVD-R serving as an optical disk according to the second embodiment.

FIG. 3 illustrates a correlation between the spherical aberration and the jitter, and a correlation between the spherical aberration and the $\beta$ (beta) value in the case of using the DVD-R as the optical disk. In FIG. 3, a horizontal axis represents an amount of spherical aberration, a vertical axis represents the jitter [%] and the $\beta$ value [dB], and a center of the horizontal axis represents that the spherical aberration becomes zero.

As understood from FIG. 3, a position at which the jitter is minimized and that at which the spherical aberration is approximately minimized, that is, approximately becomes zero, substantially coincide with each other. That is, the correlation between the jitter and the spherical aberration shows that the jitter increases with increasing spherical aberration.

Thus measuring the jitter as the recording characteristic and controlling the spherical aberration correcting unit 7 so as to minimize the jitter allow the amount of spherical aberration to be minimized.

In addition, as understood from FIG. 3, a position at which the $\beta$ (beta) value is maximized and that at which the spherical aberration is approximately minimized substantially coincide with each other.

Thus measuring the $\beta$ value as the recording characteristic and controlling the spherical aberration correcting unit 7 so as to maximize the $\beta$ value allow the amount of spherical aberration to be minimized.

Normalizing a difference between the land level and the pit level in the RF signal corresponding to the reproduced test recorded data with respect to the RF amplitude thereof obtains the $\beta$ value, and the RF signal is obtained by AC coupling the reflected-light from the optical disk. The $\beta$ value is strongly correlated with the asymmetry of the reproduced test recorded data. Therefore, when using the asymmetry as the recording characteristic in the case of using the DVD serving as the optical disk, correcting the spherical aberration to maximize the asymmetry allows the amount of spherical aberration to be minimized. When using the asymmetry as the recording characteristic in the case of using the CD serving as the optical disk, correcting the spherical aberration to minimize the asymmetry allows the amount of spherical aberration to be minimized.

Next, a correlation between the spherical aberration and each of the pit level and the pit ratio will now be described.

Figure 4A:
FIG. 4A illustrates examples of recording marks (pits) formed on the optical disk according to the second embodiment.
Figure 4B:
FIG. 4B illustrates levels of reflected-light from the recording marks shown in FIG. 4A.

At first, a concept of the pit level is described. As shown in FIG. 4A, assuming that recording marks (pits) RM1 and RM2 written on the recording area of the optical disk. In this case, when reproducing the optical disk, the levels of the reflected-light from the recording marks RM1 and RM2 are represented in FIG. 4B.

That is, the reflectivity of each of the portions of the recording area RM1, RM2 at which the recording marks are formed is low as compared with that of the portion of the recording area at which no recording marks are formed, so that the levels of the reflected-light beams from the portions of the recording areas RM1, RM2 are low as compared with the level of the reflected-light beam from the portion of the recording area at which no recording marks are formed.

Figure 4C:
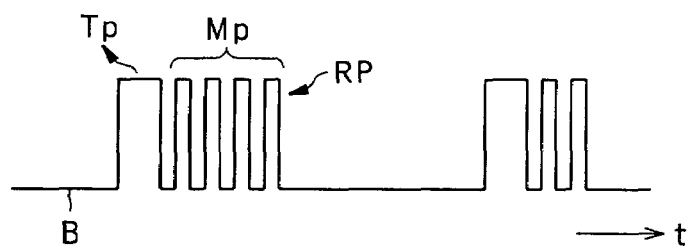
FIG. 4C illustrates waveforms of recording pulses each composed of a top pulse and multi pulses successive thereto, recording pulses which correspond to the recording marks shown in FIG. 4A.

On the other hand, it is assumed that a recording pulse RP for forming each of the recording marks RM1 and RM2 shown in FIG. 4A is composed of a top pulse Tp and multi pulses Mp that is successive thereto, and the waveform of each recording pulse RP is shown in FIG. 4C. Incidentally, the characteristic reference B represents a bias level of each of the pulses Tp and Mp.

Figure 4D:
FIG. 4D illustrates detected signals corresponding to reflected-lights from the recording marks shown in FIG. 4A.

When the recording pulses each having the waveform shown in FIG. 4C drive the laser diode of the pickup, the signals S4 detected by the pickup 2 and the amplifier 3 on the basis of the reflected-light from each of the recording marks RM1 and RM2 can be shown in FIG. 4D.

Figure 4E:
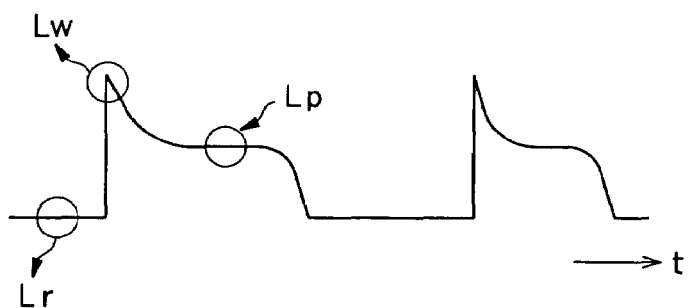
FIG. 4E illustrates waveforms of signals obtained by eliminating high frequency components from the detected signals shown in FIG. 4D.

High frequency components in the signals S4 are eliminated through an LPF (low pass filter) so that signals S5 are obtained whose waveforms are shown in FIG. 4E.

In each of the signals S5, a level corresponding to the top pulse Tp of the recording pulse RP shown in FIG. 4C becomes a write level Lw, a level corresponding to the multi pulses Mp of the recording pulse RP shown in FIG. 4C becomes a pit level Lp, and a level corresponding to the bias level B of the recording pulse RP shown in FIG. 4C becomes a read level Lr.

Figure 5A:
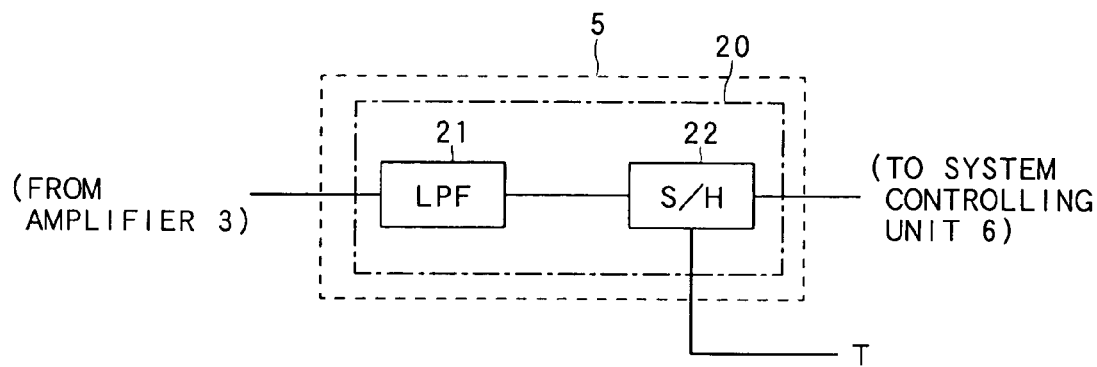
FIG. 5A is a block diagram showing a circuit structure of a circuit for obtaining a pit level according to the second embodiment.

A circuit structure for obtaining the pit level Lp, the write level Lw, and the real level Lr is shown in FIG. 5A. This circuit 20 is installed on the recording characteristic analyzing unit 5.

When using the recording pulse RP composed of the top pulse Tp and the multi pulses Mp shown in FIG. 4C, the detected signal S4 includes the pulse train so that it is impossible to detect levels such as the pit level and so on from the detected signal S4.

Then, as shown in FIG. 5A, the signal S4 transmitted from the amplifier 3 is inputted to the LPF 21 of the circuit 20 so that only low frequency components are extracted from the signal S4, thereby obtaining the signal S5 shown in FIG. 4E.

The signal S5 is inputted to a sample/hold (S/H) unit 22 of the circuit 20. The S/H unit 22 samples and holds each of the pit level Lp, the write level Lw, and the read level Lr at each predetermined timing decided by each timing signal T inputted to the S/H unit 22. Each timing of each timing signal T depends on each level Lp, Lw and Lr.

For example, when sampling and holding the write level Lw, the timing signal T is set to represent the timing corresponding to the top pulse Tp. When sampling and holding the pit level Lp, the timing signal T is set to represent the timing corresponding to the substantially center portion of the multi-pulse period representing a period between a beginning multi pulse Mp to an end multi pulse Mp.

The pit level Lp represents a level of the reflected-light obtained while forming the pit (recording mark) by the recording pulse RP so that it provides an indication of representing how accurately the pit (recording mark) is formed.

That is, when the pit is accurately formed according to the recording pulse, the reflectivity of the formed portion is made low, causing the pit level Lp to be low sufficiently. On the other hand, when the pit is not accurately formed, the reflectivity of the portion of the recording area at which the pit is supposed to be formed keeps high, causing the pit level Lp to be high.

Next, a concept of the pit ratio is described.

The pit ratio is shown as a ratio of write level Lw, the recording power Pr or the read level Lr to the pit level Lp.

That is, the pit level is represented by one of the expressions (1) to (3) hereinafter.

$$\text{Pit ratio}=(Lw-Lp)/Lw \qquad (1)$$

$$\text{Pit ratio}=(Pr)/Lp \qquad (2)$$

$$\text{Pit ratio}=Lr/Lp \qquad (3)$$

These expressions show that, when the pit is accurately formed while recording the pit, the pit level Lp is made low, causing the pit ratio to be increased.

Figure 6A:
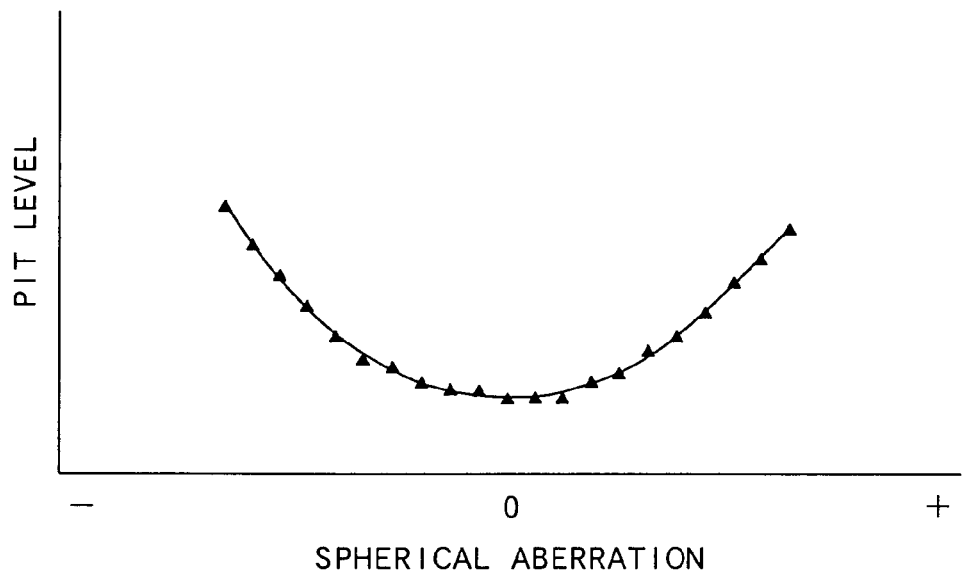
FIG. 6A is a view showing a correlation between the spherical aberration and the pit level in the case of using the DVD-R serving as the optical disk according to the second embodiment.

FIG. 6A shows a correlation between the spherical aberration and the pit level Lp in the case of using the DVD-R as the optical disk. In FIG. 6A, a horizontal axis represents an amount of spherical aberration and a vertical axis represents the pit level Lp.

As shown in FIG. 6A, when the pit is accurately formed, the lower the pit level is, the more decreased the spherical aberration is. A position at which the pit level Lp is minimized and that at which the spherical aberration is approximately minimized coincide with each other.

Thus, measuring the pit level Lp as the recording characteristic while recording the pit and deciding the spherical aberration so as to minimize the pit level allow the amount of spherical aberration to be minimized.

Figure 6B:
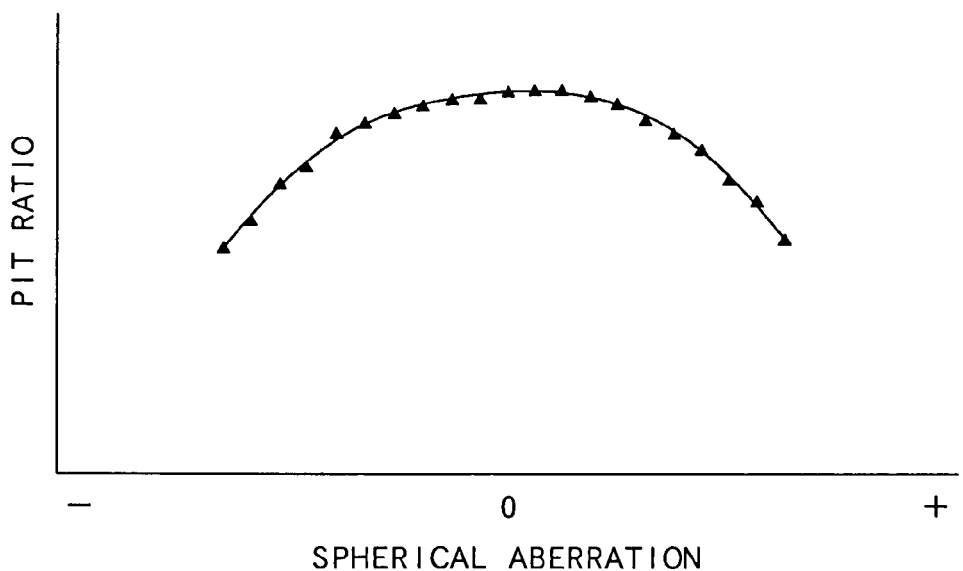
FIG. 6B is a view showing a correlation between a pit ratio and the spherical aberration according to the second embodiment.

FIG. 6B shows a correlation between the pit ratio and the spherical aberration.

As shown in FIG. 6B, the lower the pit level Lp is and the higher the pit ratio is, the more decreased the spherical aberration. A position at which the pit ratio is maximized and a position at which the spherical aberration is approximately minimized coincide with each other.

Thus, detecting the pit level LP, the write level Lw or the read level Lr to obtain the pit ratio and deciding the spherical aberration so as to maximize the pit ratio allow the amount of spherical aberration to be minimized.

Figure 5B:
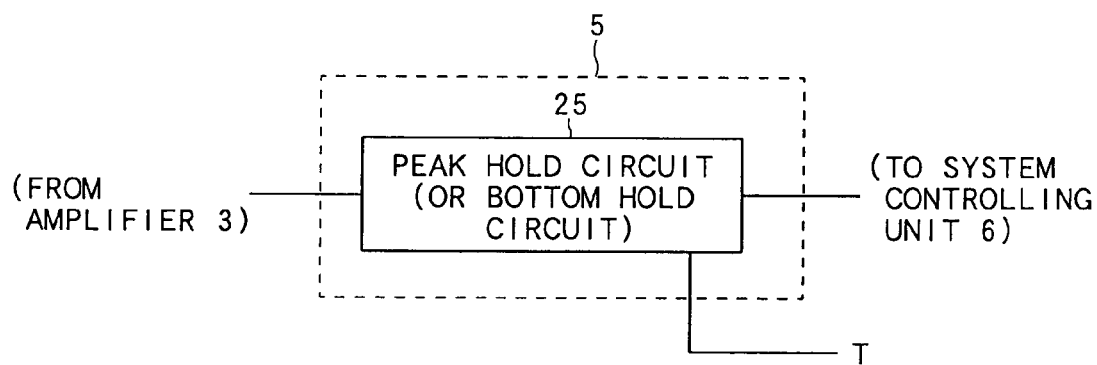
FIG. 5B is a block diagram showing another circuit structure of a peak hold circuit for obtaining a pit level according to the second embodiment.

Incidentally, the circuit 20 which is an example for obtaining the pit level Lp, the write level Lw and the read level Lr is shown in FIG. 5A. In place of the circuit 20, as shown in FIG. 5B, a peak hold circuit (or a bottom hold circuit) 25 may be installed in the recording characteristic analyzing unit 5. When using the peak hold circuit (or a bottom hold circuit) 25, the LPF 21 is made redundant, which should be omitted.

As shown in FIG. 4E, when the detected signal S5 has the positive polarization, the peak hold circuit may be used, and when the detected signal S5 has the negative polarization, the bottom hold circuit may be used. That is, the peak hold circuit (bottom hold circuit) 25 may hold each of the pit level Lp, the write level Lw, and the read level Lr at each predetermined timing decided by each timing signal T inputted to the peak hold circuit (bottom hold circuit) 25.

Figure 5C:
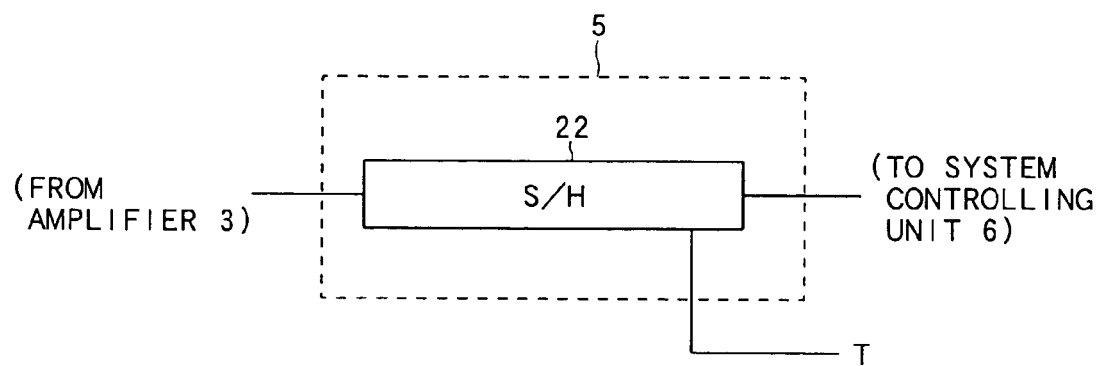
FIG. 5C is a block diagram showing another circuit structure of a sample/hold circuit for obtaining a pit level according to the second embodiment.

When using a non-multi type of recording pulse in place of the recording pulse RP shown in FIG. 4C, only the sample/hold circuit 22 may be used so that the LPF 21 is made redundant, shown in FIG. 5C. The waveform of the non-multi type of recording pulse has no multi pulses Mp so that the high frequency components shown in FIG. 4D are low in the detected signal, whereby sampling and holding the levels of the detected signal allow each level Lp, Lw, Lr to be obtained.

Next, a correlation between the spherical aberration and the recording power Pr will be described hereinafter.

FIG. 7 shows a correlation between the spherical aberration and a recording power required for forming a pit from which a constant $\beta$ value, constant modulation or a constant asymmetry are obtained, that is, a pit fulfills a constant standard.

As understood in FIG. 7, when the spherical aberration is minimized, the recording power is minimized. That is, minimizing the spherical aberration allows the usability of the recording power to be maximized, whereby it is turned out that, even when using weak recording power, good pits can be formed.

As described above, analyzing each of the recording characteristics related to each of the parameters allows conditions to be obtained, conditions which are capable of minimizing the spherical aberration. Concretely, reproducing the pit formed by the test recording obtains the parameters including the jitter, the $\beta$ value, the asymmetry, the modulation and the like, and when the jitter is minimized, and the $\beta$ value, the asymmetry and the modulation are maximized, the spherical aberration is minimized.

In addition, as the pit level and the pit ratio obtained while recording the pit in the parameters, when the pit level is minimized and the pit ratio is maximized, the spherical aberration is minimized.

Then, deciding the optimum correction amount of spherical aberration so as to minimize the spherical aberration according to the parameters and controlling the spherical aberration unit 7 on the basis of the decided amount of spherical aberration allows the spherical aberration to be minimized.

[Deciding Process of Optimum Correction Amount of Spherical Aberration]

Next, a deciding process of correction amount of spherical aberration will be described hereinafter. Incidentally, the recording characteristic analyzing unit 5 and the system controlling unit 6 mainly perform the deciding process. As the deciding process of correction amount of spherical aberration, two processes can be applied, sequentially described hereinafter.

(First Process)

A first process of deciding the correction amount of spherical aberration will now be described with reference to FIG. 8.

At first, the system controlling unit 6 determines whether or not a recording preparation is completed (Step S1). For example, when the system controlling unit 6 detects that a user who handles the information recording system 1 sets an optical disk D as an object to be recorded to the information recording system 1 and/or issues a command for recording, the system controlling unit 6 determines that the recording preparation is completed (YES (Y) at Step S1).

The system controlling unit 6 then controls the pickup 2 to make move the pickup 2 above the test recording area previously formed on the recording surface of the optical disk D (Step S2). As the test recording area, for example, PCA (Power Calibration Area) or the like previously formed on the recording area of the optical disk D can be used, the PCA being used for calibrating the power of the optical beam 9.

The system controlling unit 6 first sets a correction amount of spherical aberration which is an initial amount (Step S3). The initial amount of spherical aberration is previously set according to the experimental result or the like to be stored on, for example, a ROM in the system controlling unit 6. The system controlling unit 6 generates the control signal S3 according to the initial amount of spherical aberration to supply a generated control signal S3 to the spherical aberration correcting unit 7. Then, when starting the test recording, the spherical aberration correcting unit 7 performs the correction of the spherical aberration according to the initial amount of the spherical aberration.

The system controlling unit 6 then performs the test recording on the test recording area of the optical disk D (Step S4). That is, the system controlling unit 6 controls the pickup 2 according to the previously prepared test-recording signal, thereby irradiating the optical beam 9 onto the test recording area of the recording surface of the optical disk, thereby the test-recording data including the pits being formed thereon.

Incidentally, in cases where the test-recording signal can arbitrarily be set, but predetermined test-recording signals suitable for measuring each of the parameters are present, it is preferable to use the predetermined test-recording signals. That is, when the predetermined test-recording signal suitable for measuring the jitter and the predetermined test-recording signal suitable for measuring the $\beta$ value are present, respectively, it is preferable to use these test-recording signals to perform the test recording.

The system controlling unit 6 determines whether or not the test recording is completed within a required amount range of spherical aberration (Step S5). Then, the required amount range of spherical aberration show amounts required for obtaining the characteristic of the target parameter.

For example, when using the jitter as the target parameter, as shown in FIG. 3, the spherical aberration is minimized when the jitter is minimized. Then, the system controlling unit 6 makes change to the amount of spherical aberration set in the step S3 within the range in which the minimum of jitter is included, whereby performing the test recording.

Similarly, when using the $\beta$ value as the target parameter, as shown in FIG. 3, the system controlling unit 6 makes change to the amount of spherical aberration set in the step S3 within the range in which the maximum of $\beta$ value is included, whereby performing the test recording. Incidentally, the correlation between each parameter and the spherical aberration shown in FIG. 3 can be previously experimentally obtained within a certain degree of accuracy, so that to decide the limits of changing the correction amounts of spherical aberration allows the system controlling unit 6 to carry out the process of changing the correction amount of spherical aberration within the decided limits.

Then, when the system controlling unit 6 ends the test recording within the required correction amounts of spherical aberration (Yes at Step S5), the system controlling unit 6 makes control the recording characteristic analyzing unit 5 to reproduce the test-recording data and to analyze the at least one of the characteristics corresponding to at least one of the parameters as the target parameter (Step. S6). Concretely, the system controlling unit 6 makes control the recording characteristic analyzing unit 5 to reproduce the test-recording data to measure the at least one of the characteristics, which corresponds to the at least one of the parameters correlated with the spherical aberration, parameters which include the jitter, the β value, the modulation, the asymmetry and the like.

As to the case of using the jitter and/or the β value as the target parameter, the measured result is illustrated in FIG. 3.

The system controlling unit 6 decides an optimum correction amount of the spherical aberration according to the measured result (Step S7). For example, when using the jitter as the target parameter, the system controlling unit 6 decides the correction amount of spherical aberration as the optimum correction amount thereof at which the jitter is minimized in the obtained characteristic of the jitter in Step S6. When using the β value as the target parameter, the system controlling unit 6 decides the correction amount of spherical aberration as the optimum correction amount thereof at which the β value is maximized in the obtained characteristic of the β value in Step S6. Then, the deciding process of the optimum correction amount of spherical aberration is completed. The decided optimum correction amount of spherical aberration is stored in a memory of the system controlling unit 6.

After deciding the optimum correction amount of spherical aberration, when the system controlling unit 6 receives a command for recording from the user, the system controlling unit 6 supplies the control signal S3 corresponding to the stored optimum correction amount of spherical aberration to the spherical aberration correcting unit 7, thereby recording bits of information on the recording surface of the optical disk D while correcting the spherical aberration in the optical beam 9.

Because the optimum correction amount of spherical aberration is decided when the optical disk D is actually set to the information recording system 1 for recording bits of information on the optical disk D, the spherical aberration in the optical beam 9 is optimally corrected, thus permitting the information to be recorded on the optical disk D in an excellent condition.

(Second Process)

A second process of deciding the correction amount of spherical aberration will now be described with reference to FIG. 9.

After the test recording has been completed, the first process reproduces the test-recording data to measure the characteristic of the target parameter according to the reproduced test-recording data, thereby deciding an optimum correction amount of spherical aberration on the basis of the measured characteristic of the target parameter.

In contrast, in this second process, the system controlling unit 6 measures the characteristic of the target parameter such as the pit level and/or the pit ratio while performing the test recording to decide the optimum correction amount of spherical aberration on the basis of the measured characteristic of the target parameter.

Figure 8:
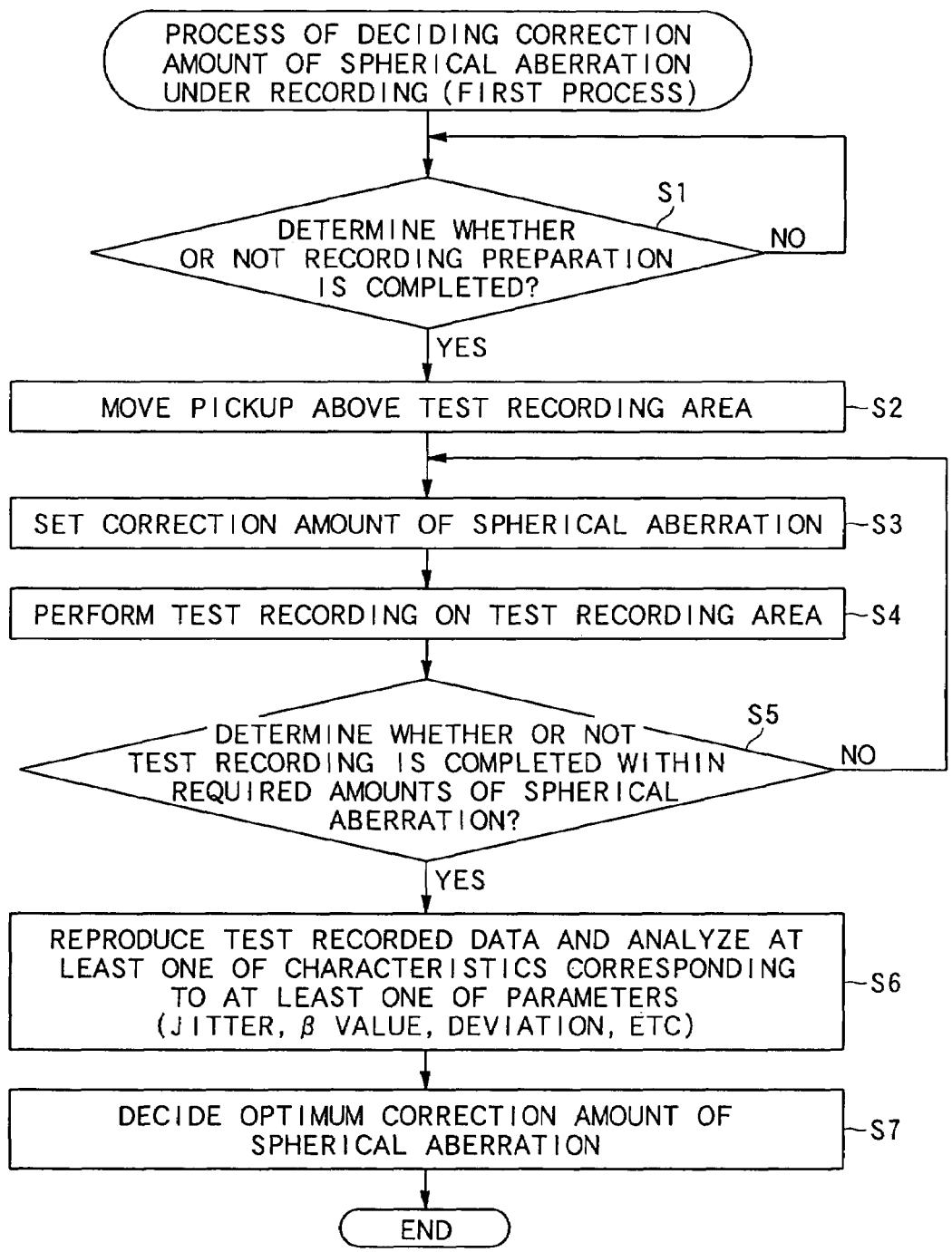
FIG. 8 is a flowchart showing a first process of deciding a correction amount of spherical aberration according to the second embodiment.
Figure 9:
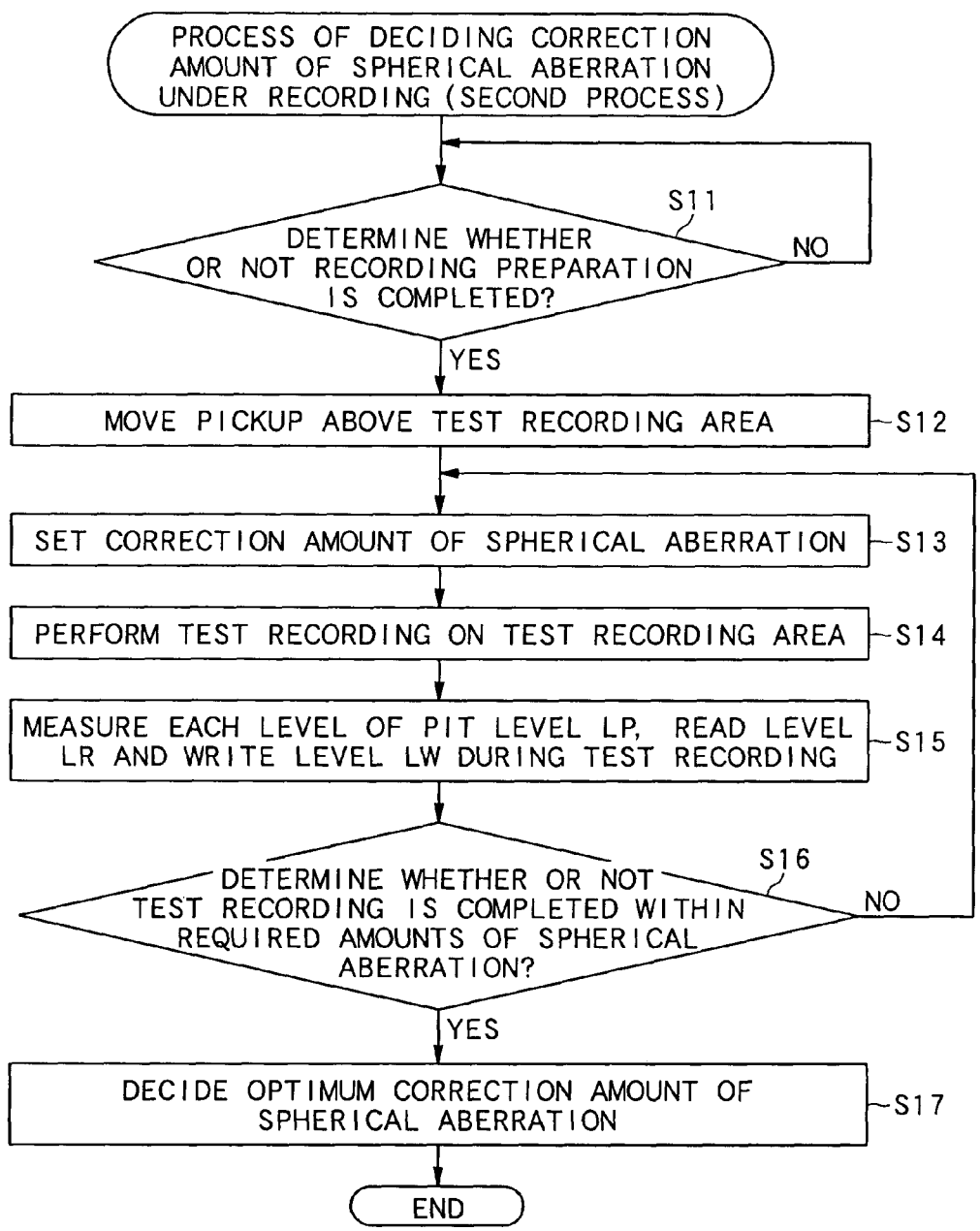
FIG. 9 is a flowchart showing a second process of deciding a correction amount of spherical aberration according to the second embodiment.

As shown in FIG. 9, the processes at the step S11 to step S14 are the same in the processing as the processes at the step S1 to step S4 shown in FIG. 8, thus omitting the description of such processing.

In the second process, as shown in FIG. 9, while performing the test recording at step S14, the system controlling unit 6 measures the pit level Lp and at least one of the read level Lr and the write level Lw according to the reflected-light from the pit which is formed by the test recording (Step 15). The system controlling unit 6 determines whether or not the test recording is completed within a required amount range of spherical aberration (Step S16). Then, similarly to that in the first process, the required amount range of spherical aberration show amounts required for obtaining the characteristic of the target parameter.

For example, when using the pit level as the target parameter, as shown in FIG. 6A, the amount of spherical aberration is set within the range in which the minimum of pit level is included, and when using the pit ratio as the target parameter, as shown in FIG. 6B, the amount of spherical aberration is set within the range in which the maximum of pit ratio is included.

Then, when the system controlling unit 6 ends the test recording within the required correction amounts of spherical aberration YES at Step S16), the characteristic of the pit level Lp and at least one of the read level Lr and the write level Lw measured during the test recording are already obtained at the end of the test recording. The system controlling unit 6 decides the optimum correction amount of spherical aberration so as to minimize the pit level Lp (referring to FIG. 6A), or maximize the pit ratio (referring to FIG. 6B) according to these obtained characteristics. As a result, it is possible to decide the optimum correction amount of spherical aberration on the basis of the characteristics of parameters obtained during the test recording.

After the test recording is completed, the first process reproduces the test-recording data to measure the characteristic of the target parameter according to the reproduced test-recording data. In contrast, the second process measures the characteristic of the target parameter during the test recording so that the characteristic of the target parameter are already obtained at the end of the test recording, making it possible to decide the optimum correction amount of spherical aberration immediately after the end of the test recording.

[Examples of Spherical Aberration Correcting Unit]

As described above, in this second embodiment, any spherical aberration correcting unit 7 having any systems and structures may be used. Examples of the spherical aberration correcting units are explained.

FIG. 10A typically illustrates the structure of a liquid crystal type of spherical aberration correcting unit 7a described above. The spherical aberration correcting unit 7a is arranged to be inserted between the laser diode as the light source and placed on the optical beam path.

That is, the spherical aberration correcting unit 7a comprises a plurality of liquid crystal regions A, B and C concentrically arranged and placed in the optical beam path, variable voltages Va, Vb and Vc applied to the liquid crystal regions A, B and C and a control unit 55 connected to the variable voltages Va, Vb and Vc and to the system control unit 7.

That is, the control unit 55 of the spherical aberration correcting unit 7a is configured to control, according to the control signal S3 from the system controlling unit 7, the variable voltages Va, Vb and Vc applied to the liquid crystal regions A, B and C, respectively, so as to cause changes in the phase of the optical beam 9 transmitted through the liquid crystal regions A, B and C, thereby correcting the spherical aberration of the optical beam 9. This type of spherical aberration correcting unit is disclosed in Japanese Patent Laid-open (KOKAI) Publications No. HEI10-269611 and No. 2002-15454, for instance.

FIG. 10B schematically illustrates the structure of a optical element type of spherical aberration correcting unit 7b described above.

The spherical aberration correcting unit 7b has a collimate lens 63 placed in the optical beam path between a laser diode 60 and a mirror 61, and an actuator 64 configured to movably support the collimate lens 63 along the direction of the optical beam path.

That is, the optical beam irradiated from a light source 60 is inputted to a collimate lens 62 to be converted into a collimate beam so that the collimated optical beam 9 is reflected by the mirror toward the optical disk D (the objective lens 62). The reflected optical beam 9 is inputted to the objective lens 62 to be focused onto the optical disk D.

In cases where an error of thickness or the like causes a first spherical aberration in the reflected-light from the optical disk D, the actuator 64 controls the collimate lens 63 to move along the optical beam path shown by an arrow in FIG. 10B, whereby making occur a second spherical aberration which has an inverted characteristic of the first spherical aberration already caused in the optical beam 9. That is, the actuator 64 makes the collimate lens 64 move at the position at which the second spherical aberration occurs in the optical beam 9, thereby canceling the first spherical aberration in the reflected-light and the second spherical aberrations in the optical beam 9 on the whole.

This type of spherical aberration correcting unit is disclosed in Japanese Patent Publication Laid-open (KOKAI) No. 2001-236674, for example.

As described above, the spherical aberration correcting unit 7 according to the second embodiment performs the test recording with respect to the optical disk to obtain at least one of characteristics corresponding to at least one of parameters correlated with the spherical aberration according to the test recording. The spherical aberration correcting unit 7 decides the optimum correction amount of spherical aberration so as to minimize the spherical aberration, thereby correcting the spherical aberration according to the optimum correction amount. Performing the test recording immediately before an actual recording of information allows the spherical aberration to be suitably corrected in an environment of performing the actual recording of information, making it possible to record the information on the optical disk in a high-grade condition.

In addition, as understood in FIG. 7, recording bits of information at the optimum amount of spherical aberration amount, that is, the minimum of the spherical aberration amount allows the recording power to be effectively used, making it possible to form precise pits even in the case of using a weaker amount of recording power.

In the feature, the more accelerated the rate of recording is, the more increased the recording power required for accurately forming pits is. However, in the second embodiment, performing the recording of information in the optimum spherical aberration permits the recording power to decrease, thus a margin with respect to the maximum power of the laser diode controlling the generation of optical beam being increased. In addition, it is possible to prevent the temperature of the laser diode or the entire information recording system during the recording from increasing.

The entire disclosure of Japanese Patent Application No. 2002-216667 filed on Jul. 25, 2002 including the specification, claims, drawings and summary is incorporated herein by reference in its entirety.

What is claimed is:

1. A spherical aberration correcting apparatus comprising:
a test recording unit configured to perform a test recording on an optical recording medium;
a characteristic obtaining unit configured to obtain a characteristic corresponding to a parameter by the test recording, the parameter being correlated with a spherical aberration;
a correction amount deciding unit configured to decide an optimum correction amount of the spherical aberration so as to minimize the spherical aberration according to the characteristic of the parameter; and
a spherical aberration correcting unit configured to correct the spherical aberration according to the optimum correction amount of the spherical aberration,
wherein the characteristic obtaining unit is configured to detect a pit level and at least one of a read level, a write level and a recording power according to a light reflected from the optical recording medium while the test recording unit performs the test recording, wherein the pit level represents a level of the optical beam reflected from the optical disk while the optical beam is forming a pit during the test recording operation, and to obtain the characteristic of a pit ratio, the pit ratio representing the ratio of one of the read level, the write level or the recording power to the pit level, wherein the spherical aberration is minimized when the characteristic of the pit ratio is maximized.

2. A spherical aberration correcting apparatus according to claim 1, wherein the characteristic obtaining unit is configured to obtain the characteristic corresponding to the parameter while the test recording unit performs the test recording.

3. A spherical aberration correcting apparatus according to claim 2, wherein the characteristic obtaining unit is configured to detect a pit level as the parameter according to a light reflected from the optical recording medium while the test recording unit performs the test recording, and to obtain the characteristic of the pit level.

4. A spherical aberration correcting apparatus according to claim 1, wherein the test recording unit makes change to an amount of the spherical aberration within a range in which a predetermined value of the parameter is included while performing the test recording, the predetermined value of the parameter being set to correspond to a minimum of the spherical aberration.

5. A spherical aberration correcting apparatus according to claim 4, wherein the parameter includes a jitter, and the predetermined value of the jitter is minimum.

6. A spherical aberration correcting apparatus according to claim 4, wherein the parameter includes a β value, and the predetermined value of the β value is maximum.

7. A spherical aberration correcting apparatus according to claim 1, wherein the test recording unit is configured to perform the test recording immediately before a recording of information on the optical recording medium.

8. An information recording system comprising:
a spherical aberration correcting apparatus provided with
a test recording unit configured to perform a test recording on an optical recording medium,
a characteristic obtaining unit configured to obtain a characteristic corresponding to a parameter according to the test recording, the parameter being correlated with a spherical aberration,
a correcting amount deciding unit configured to decide an optimum correcting amount of the spherical aberration so as to minimize the spherical aberration according to the characteristic of the parameter, and a spherical aberration correcting unit configured to correct the spherical aberration according to the optimum correcting amount of the spherical aberration; and a control unit configured to, when detecting that the optical recording to the information recording apparatus, make control the spherical aberration correcting apparatus to correct the spherical aberration, wherein the characteristic obtaining unit is configured to detect a pit level and at least one of a read level, a write level and a recording power according to a light reflected from the optical recording medium while the test recording unit performs the test recording, wherein the pit level represents a level of the optical beam reflected from the optical disk while the optical beam is forming a pit during the test recording operation, and to obtain the characteristic of a pit ratio, the pit ratio representing the ratio of one of the read level, the write level or the recording power to the pit level, wherein the spherical aberration is minimized when the characteristic of the pit ratio is maximized.

9. A spherical aberration correcting method comprising the steps of:

performing a test recording on an optical recording medium;

obtaining a characteristic corresponding to a parameter by the test recording, the parameter being correlated with a spherical aberration;

deciding an optimum correction amount of the spherical aberration so as to minimize the spherical aberration according to the characteristic of the parameter; and correcting the spherical aberration according to the optimum correction amount of the spherical aberration;

wherein the step of obtaining a characteristic comprises the steps of:

detecting a pit level and at least one of a read level, a write level and a recording power according to a light reflected from the optical recording medium while the test recording is performed, wherein the pit level represents a level of the optical beam reflected from the optical disk while the optical beam is forming a pit during the test recording operation; and obtaining the characteristic of a pit ratio, the pit ratio representing the ratio of one of the read level, the write level or the recording power to the pit level, wherein the spherical aberration is minimized when the characteristic of the pit ratio is maximized.

* * * * *